(12) United States Patent
Thorn et al.

(10) Patent No.: US 7,736,531 B2
(45) Date of Patent: Jun. 15, 2010

(54) COMPOSITION AND METHOD FOR STORING AND RELEASING HYDROGEN

(75) Inventors: David L. Thorn, Los Alamos, NM (US); William Tumas, Los Alamos, NM (US); Kevin C. Ott, Los Alamos, NM (US); Anthony K. Burrell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 547 days.

(21) Appl. No.: 11/704,493

(22) Filed: Feb. 8, 2007

(65) Prior Publication Data

US 2007/0183967 A1 Aug. 9, 2007

Related U.S. Application Data

(60) Provisional application No. 60/771,841, filed on Feb. 8, 2006.

(51) Int. Cl.
*C09K 3/00* (2006.01)
*C01B 3/02* (2006.01)
*C01B 3/04* (2006.01)

(52) U.S. Cl. ............................ 252/183.13; 423/648.1; 423/658.2

(58) Field of Classification Search ............ 423/648.1; 252/183.13
See application file for complete search history.

(56) References Cited

U.S. PATENT DOCUMENTS

| 4,988,661 | A | * | 1/1991 | Arai et al. ............... 502/327 |
| 5,336,833 | A | * | 8/1994 | Joly et al. ............... 585/731 |
| 5,345,028 | A | * | 9/1994 | Alerasool ............... 585/730 |
| 6,444,190 | B2 | * | 9/2002 | Pautard-Cooper et al. ... 423/644 |
| 2002/0197205 | A1 | * | 12/2002 | Mahajan ............... 423/655 |
| 2005/0034357 | A1 | * | 2/2005 | Nemeth et al. ............ 44/265 |
| 2007/0194273 | A1 | * | 8/2007 | Zhao et al. ............ 252/182.12 |

FOREIGN PATENT DOCUMENTS

JP 2-277822 * 11/1990

* cited by examiner

*Primary Examiner*—Wayne Langel
(74) *Attorney, Agent, or Firm*—Samuel L. Borkowsky

(57) ABSTRACT

A chemical system for storing and releasing hydrogen utilizes an endothermic reaction that releases hydrogen coupled to an exothermic reaction to drive the process thermodynamically, or an exothermic reaction that releases hydrogen coupled to an endothermic reaction.

4 Claims, 3 Drawing Sheets

COMPOSITION AND METHOD FOR STORING AND RELEASING HYDROGEN

RELATED APPLICATIONS

This application claims the benefit of U.S. Provisional Patent Application Ser. No. 60/771,841 entitled "Composition and Method for Storing and Releasing Hydrogen," filed on Feb. 8, 2006, incorporated by reference herein.

STATEMENT REGARDING FEDERAL RIGHTS

This invention was made with government support under Contract No. DE-AC51-06NA25396 awarded by the U.S. Department of Energy. The government has certain rights in the invent

FIELD OF THE INVENTION

The present invention relates generally to hydrogen storage, and more particularly to a composition and method for storing and releasing hydrogen.

BACKGROUND OF THE INVENTION

Hydrogen ($H_2$) is currently the leading candidate for a fuel to replace gasoline/diesel fuel in powering the nation's transportation fleet. There are a number of difficulties and technological barriers associated with hydrogen that must be solved in order to realize this "hydrogen economy". Inadequate storage systems for on-board transportation hydrogen are recognized as a major technological barrier (see, for example, "The Hydrogen Economy: Opportunities, Costs, Barriers, and R&D Needs," National Academy of Engineering (NAE), Board on Energy and Environmental Systems, National Academy Press (2004)).

Materials that store hydrogen, and from which hydrogen can be released easily without requiring significant energy input or releasing significant amounts of wasted energy, are of great interest as possible means to enable the hydrogen economy, especially for vehicular transportation. Most materials that chemically store hydrogen, however, either release the hydrogen exothermically (thus require significant energy for their manufacture), or require elevated temperature and the input of significant heat energy for hydrogen release. In either case, the storage loses efficiency.

One of the general schemes for storing hydrogen relates to using a chemical compound or system that undergoes a chemical reaction to evolve hydrogen as a reaction product. In principle, this chemical storage system is attractive, but systems that have been studied to date involve either: (a) hydrolysis of high-energy inorganic compounds where the evolution of hydrogen is very exothermic (sodium borohydride/water as in the Millennium Cell's HYDROGEN ON DEMAND®, and lithium (or magnesium) hydride as in SAFE HYDROGEN®, for example), thus making the cost of preparing the inorganic compound(s) high and life-cycle efficiency low; or (b) dehydrogenation of inorganic hydride materials (such as $Na_3AlH_6/NaAlH_4$, for example) that release hydrogen when warmed but that typically have inadequate mass storage capacity and inadequate refueling rates.

Inorganic compounds referred to in (a), above, produce hydrogen according to the chemical reaction $$MH_x + xH_2O \rightarrow M(OH)_x + xH_2 \quad (1)$$

where $MH_x$ is a metal hydride, and $M(OH)_x$ is a metal hydroxide. This reaction is irreversible.

Inorganic hydride materials referred to in (b), above, produce hydrogen according to the following chemical reaction, which is reversible with $H_2$ (hydrogen gas):

$$MH_x = M + x/2 H_2 \quad (2)$$

where $MH_x$ is a metal hydride, M is metal and $H_2$ is hydrogen gas. By contrast to the first reaction, which is irreversible with $H_2$, the second reaction is reversible with $H_2$.

A practical chemical system that evolves hydrogen yet does not suffer the aforementioned inadequacies would be important to the planned transportation sector of the hydrogen economy. This same practical chemical system would also be extremely valuable for non-transportation $H_2$ fuel cell systems, such as those employed in laptop computers and other portable electronic devices, and in small mechanical devices such as lawnmowers where current technology causes significant pollution concerns.

Any heat that must be input to evolve the hydrogen represents an energy loss at the point of use, and any heat that is evolved along with the hydrogen represents an energy loss where the chemical storage medium is regenerated. Either way, energy is lost, which diminishes the life-cycle efficiency. For most organic compounds, such as in those shown in equations 3-5 below, hydrogen evolution reactions are very endothermic, and the compounds are incompetent to evolve hydrogen at ambient temperature (i.e. thermodynamically incapable of evolving $H_2$ at significant pressure at ambient temperature). For temperatures less than about 250-400 degrees Celsius, the equilibrium pressure of hydrogen over most organic compounds is very small. As a consequence, most common organic compounds require heating above about 250 degrees Celsius, and the continual input of high-grade heat to maintain this temperature, in order to evolve hydrogen at a useful pressure.

$$CH_4 \rightarrow C + 2H_2 \; \Delta H^0 = +18 \text{ kcal/mol} \; \Delta G^0 = +12 \text{ kcal/mol} \quad (3)$$

$$6CH_4 \rightarrow \text{cyclohexane} + 6H_2 \; \Delta H^0 = +69 \text{ kcal/mol} \; \Delta G^0 = +78 \text{ kcal/mol} \quad (4)$$

$$\text{cyclohexane} \rightarrow \text{benzene} + 3H_2 \; \Delta H^0 = +49 \text{ kcal/mol} \; \Delta G^0 = +23 \text{ kcal/mol} \quad (5)$$

Most organic compounds have hydrogen evolution reactions that are endergonic (i.e. having a net positive free energy of reaction, i.e. $\Delta G > 0$) and their ambient temperature equilibrium hydrogen pressure is very low, practically unobservable. Thus, most organic compounds are unsuitable for hydrogen storage, based on both life-cycle energy efficiency and delivery pressure considerations. Decalin, for example, evolves hydrogen to form naphthalene when heated to about 250 degrees Celsius in the presence of a catalyst (see, for example, "Catalytic Decalin Dehydrogenation/Naphthalene Hydrogenation Pair as a Hydrogen Source for Fuel-Cell Vehicle," Hodoshima et al., J. Hydrogen Energy (2003) vol. 28, pp. 1255-1262, incorporated by reference herein). Hodoshima et al. use a superheated "thin film" reactor that operates at a temperature of at least 280 degrees Celsius to produce hydrogen from decalin at an adequate rate. Thus, this endothermic hydrogen evolution reaction requires both a complex apparatus and high-grade heat, which diminishes the life-cycle energy efficiency for hydrogen storage.

Boranes (i.e. borane compounds) have high hydrogen storage capacities and have attracted interest for use as hydrogen storage materials for transportation, but the difficulty of manufacturing borane compounds, and the life-cycle energy inefficiency of their present manufacture chemical processes, prevents their widespread use.

Methods and systems that employ chemical compounds for storing and evolving hydrogen at ambient temperature with minimal heat input remain highly desirable.

SUMMARY OF THE INVENTION

In accordance with the purposes of the present invention, as embodied and broadly described herein, the present invention includes a composition comprising magnesium alkoxide, magnesium hydroxide, and a catalyst.

The invention also includes a composition for storing hydrogen. The composition includes a first component that undergoes an endothermic reaction that releases hydrogen, and a second component in contact with the first component, wherein the second component is capable of undergoing an exothermic reaction that provides sufficient energy for the release of hydrogen from the first component.

The invention also includes a method for releasing hydrogen. The method uses a composition of a first component and a second component in contact with the first component, where the first component is capable of undergoing an endothermic reaction that releases hydrogen, and the second component is capable of undergoing an exothermic reaction that provides sufficient energy for the release of hydrogen from the first component. The method involves forming the composition and then initiating the exothermic reaction.

The invention also includes a composition for storing hydrogen that comprises a first component and a second component that is in contact with the first component. The first component undergoes an exothermic reaction that releases hydrogen, and the second component is capable of undergoing an endothermic reaction that moderates the exothermic release of hydrogen from the first component.

The invention also includes a method for releasing hydrogen that comprises forming a composition comprising a first component that undergoes an exothermic reaction that releases hydrogen, and a second component in contact with the first component, the second component undergoing an endothermic reaction capable of moderating the exothermic release of hydrogen from the first component.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Figure 1:
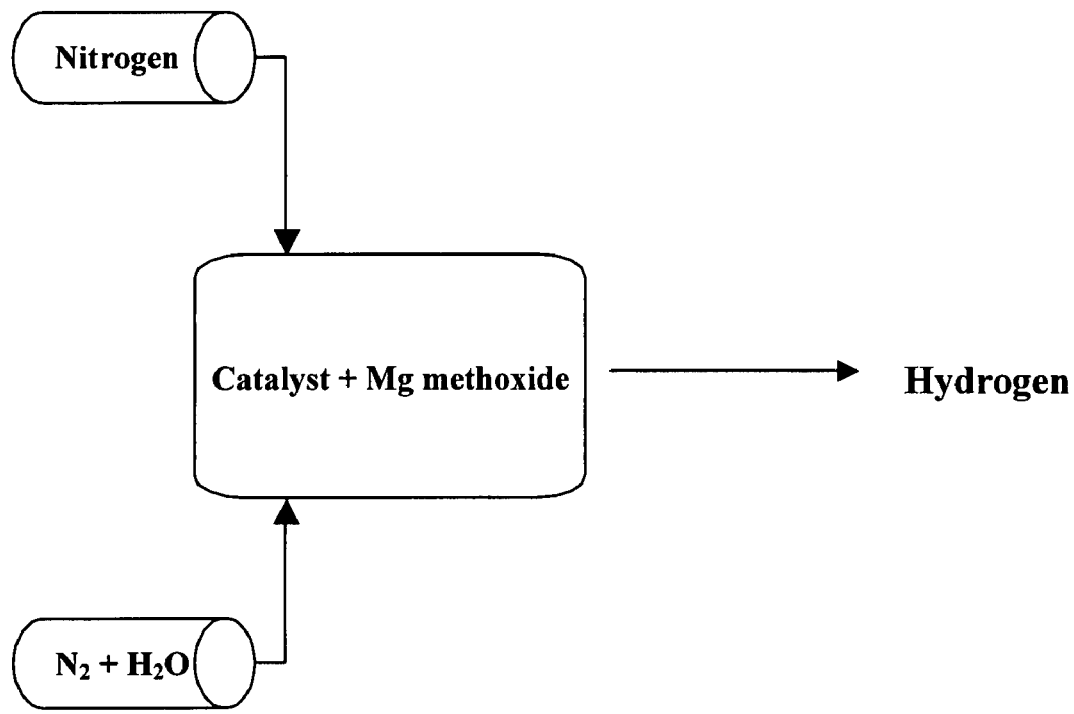
FIG. 1 shows a schematic representation of an experimental set-up for the production of hydrogen from magnesium methoxide.

The invention is concerned with a chemical hydrogen storage system that utilizes coupled reactions: an endothermic reaction (that releases hydrogen) that is coupled to an exothermic reaction to achieve overall thermoneutrality.

According to the invention, a endothermic hydrogen-evolving reaction (that ordinarily requires externally-supplied heat energy for releasing the hydrogen) is coupled to an exothermic reaction such that the overall coupled reaction is close to thermoneutral and requires significantly less heat energy than it would without the exothermic reaction. An example is combining the endothermic "reforming" reaction of methanol or other alcohols (ethanol, ethylene glycol, sucrose, fructose, glucose, other carbohydrates, for example) with water (to make $H_2$ and $CO_2$) with the exothermic reaction of $CO_2$ with a metal oxide to make the corresponding carbonate material. The simplest way to couple these reactions is to prepare a composite material having all components in close physical proximity.

An exemplary hydrogen storage system of the invention is concerned with the catalytic aqueous reforming of alcohols to form hydrogen and carbon dioxide. The coupled reaction is the reaction of the carbon dioxide formed in the endothermic hydrogen-releasing reaction with metal oxide to form a stable metal carbonate. The exothermic formation of metal carbonate drives the hydrogen releasing reaction thermodynamically. Magnesium oxide is used as the metal oxide.

In addition to the thermodynamic promotion, magnesium oxide may provide kinetic promotion by performing hydride transfer reactions (see, for example: Aramendia et al., "Influence of the Preparation Method on the Structural and Surface Properties of Various Magnesium Oxides and Their Catalytic Activity in the Meerwein-Ponndorf Verley Reaction," Applied Catalysis A, (2003) vol. 244, pp. 207-215). Methanol reforming is catalyzed by, for example, nickel-doped MgO and Cu-containing oxides. Magnesium oxide is the most attractive oxide base owing to the ease of cracking the carbonate back to the oxide for recycle, its light weight (only lithium oxide and beryllium oxide are lower molecular weight metal oxides) and relative safety (lithium oxide is extremely caustic, and beryllium oxide is toxic, whereas magnesium hydroxide is routinely taken internally as "Milk of Magnesia"). Higher molecular weight oxides such as calcium oxide provide a larger thermodynamic coupling and have been used in the context of known "sorption-enhanced reforming" processes, but cracking calcium carbonate back to the oxide requires a greater energy input. It is believed that the "sorption-enhanced reforming" process has not been applied to hydrogen storage materials.

A commercially available copper-containing catalyst was mixed with magnesium methoxide. The resulting composition produced hydrogen when heated in the presence of water. The generation of hydrogen from the catalyzed thermolysis of mixtures of magnesium methoxide and magnesium hydroxide has been demonstrated without any added water.

The aforementioned copper catalyst was also mixed with magnesium methoxide and magnesium hydroxide in a ratio of 1:3. The resulting composition produced hydrogen when heated in the presence or absence of water.

These exemplary compositions of the invention are stable, solid hydrogen storage materials whose regeneration requires, in principle, only heat and methanol.

According to the invention, a hydrogen-evolving reaction that would ordinarily be endothermic (and thus require externally supplied heat energy for releasing the hydrogen) may be coupled with another reaction that is exothermic such that the overall combined process is close to thermoneutral and requires significantly less heat energy. An embodiment is the combination of the following two reactions: (1) the endothermic reforming reaction of methanol or other alcohol(s) with water to produce $H_2$ and $CO_2$; and (2) the exothermic reaction of $CO_2$ with a metal oxide to make the corresponding carbonate compound. The simplest way to couple these reactions is to prepare a composite material having all of the components in close physical proximity.

Catalysts useful with the invention include copper, copper oxide, zinc, zinc oxide, nickel, nickel oxide, cobalt, cobalt oxide, palladium, platinum, ruthenium, rhodium, and mixtures (or alloys) of these materials. Catalysts may be used with or without an additional support (aluminum, aluminum oxide, zirconium, zirconium oxide, magnesium, magnesium oxide, and mixtures of these support materials, for example). Effective catalysts include, but are not limited to, those described by Breen et al. "Methanol Reforming for Fuel-Cell Applications: Development of Zirconia-Containing Cu—Zn—Al Catalysts," Catalysis Today, (1999) vol. 51, pp. 521-533, incorporated by reference; and by Morita et al. in "Catalytic Activity for Methanol Decomposition on Magnesium Oxide Doped With Nickel," Nippon Kagaku Kaishi (1991), number 9, pp. 1238-1240.

Composites of magnesium methoxide, magnesium hydroxide, and copper-based catalyst were prepared. A commercially available catalyst of copper-zinc oxide supported on alumina (BASF™K3) was used. The catalyst was reduced using a gaseous mixture of 5 percent hydrogen in helium at a temperature of about 285 degrees Celsius prior to mixing with the magnesium compounds. These composites react to generate hydrogen (and magnesium carbonate) at reasonable rates and quantities when heated.

In an exemplary embodiment, a composite was prepared by intimately mixing magnesium methoxide with BASF™K3 catalyst (about 20 percent by weight). For this composite, in the presence of a gaseous flow of steam in helium, (rates are limited by the amount of water used), hydrogen evolution at reasonable rates begins at a temperature of about 150 degrees Celsius. When the temperature was increased to about 200 degrees Celsius, a hydrogen evolution rate of about 5 sccm/gram of composite was observed. When the temperature was increased again (to about 260 degrees Celsius), the maximum rate of hydrogen evolution was attained under these conditions, which was about 20 sccm/gram of composite. Data indicates that the total quantity of $H_2$ liberated during such a temperature ramp is between 0.4 and 0.5 std. Liter/gram of composite. This represents from about 30 to 40 percent of the amount of $H_2$ expected. The total amount of hydrogen evolved of 0.5 liters/gram of composite is equivalent to 0.044 kg $H_2$/kg of composite, which is only slightly less than the 2007 technical target for gravimetric storage capacity of 0.045 kg $H_2$/kg of material. If the full storage potential of the composite can be reached, it will meet or exceed the 2015 technical target of 0.09 kg $H_2$/kg of material.

In another exemplary embodiment, a composite of a 3:1 molar mixture of magnesium hydroxide and magnesium methoxide blended with about 20 weight percent BASF™K3 catalyst was prepared. This composite (the magnesium hydroxide portion provides the source of water for this embodiment) produced a similar amount of hydrogen using an identical thermal treatment to the previous example. The amount of hydrogen evolved is equal to about one third of the theoretical amount of hydrogen expected. The rates of hydrogen evolution without the addition of water to this system are similar to those given above.

It should be noted that that when a composite of the magnesium compounds but without the catalyst was subjected to the aforementioned thermal treatment, very little hydrogen was evolved; mainly methanol evolution was observed.

Storing hydrogen chemically has some advantages over, for example, high-pressure tanks or pyrophoric metal hydrides. Storing hydrogen chemically in the form of methanol takes advantage of the mature state of methanol-synthesis technology, and the amount of stored hydrogen is relatively large. But there are potential disadvantages with the use of methanol: the liquid is toxic and readily contaminates groundwater, the dehydrogenation process requires significant heat input at elevated temperatures, and the hydrogen formed must be separated from the co-produced carbon dioxide. By using, for example, non-methanol-solvated magnesium methoxide/magnesium hydroxide composites (methanol-solvated magnesium methoxide is known, see, for example: Starikova et al. in "The Structure of the Crystal Solvate of Magnesium Methoxide with Methanol Mg(OMe)$_2$.3.5 MeOH," Polyhedron, (1997), vol. 16, pp. 967-974, incorporated by reference herein) as the storage material, "methanol" per se is not present and would not readily contaminate the groundwater if spilled, the thermodynamic driving force provided by the formation of magnesium carbonate significantly reduces the heat required for hydrogen release, and the carbon dioxide co-product is captured by the magnesium oxide/hydroxide to provide nearly pure $H_2$ gas. Other alcohols, for example ethanol, ethylene glycol, sucrose, fructose, glucose, other carbohydrates, could be used.

Storage materials could power small fuel cells in portable electronic devices (e.g. laptop computers, cell phones, and the like). If the hydrogen economy can be implemented for the transportation sector, the market could be enormous.

Related benefits of the invention are that the composite hydrogen storage material of the invention may be prepared at ambient temperature, without the need for thermal quenching and rapid separation, and without the energy cost of generating active metal hydrides. Spent hydrogen storage material could be regenerated in neighborhood facilities, and the regenerated material redistributed for use as a transportation fuel. Using our invention, regeneration could require electrical power as the only consumed resource.

The invention is also concerned with a chemical hydrogen storage system that utilizes an exothermic reaction that releases hydrogen that is coupled to an endothermic reaction that moderates the exothermic hydrogen release and approaches overall thermoneutrality. This aspect of the invention is concerned with forming a composition that includes a first component that undergoes an exothermic reaction that releases hydrogen, and a second component in contact with the first component, the second component undergoing an endothermic reaction capable of moderating the exothermic release of hydrogen from the first component. An example of this type of composition is a composite of finely divided ammoniaborane ($NH_3BH_3$), decalin, and a dehydrogenation catalyst such as Pd or Pt (finely divided or supported on carbon, silica or alumina). When this composite is heated, the ammoniaborane undergoes exothermic dehydrogenation to materials of the formula $(NH_2BH_2)_x$ (which can be ring compounds where x=2, 3, 4, 5, or oligomeric or polymeric chains where x is greater than about 5); or materials of the formula $(NHBH)_x$ (which can be ring compounds where x=2, 3 or oligomeric or polymeric chains where x is greater than about 3); or boron nitride (BN), or mixtures thereof. The decalin portion of the composition undergoes an endothermic dehydrogenation reaction to form naphthalene when the temperature exceeds about 250 degrees Celsius. The endothermic dehydrogenation of decalin helps moderate the exothermic dehydrogenation of ammoniaborane and also helps to prevent the temperature of the composite material from greatly exceeding 250-280 degrees Celsius. That this endothermic reaction also releases hydrogen is not essential for moderating the exothermic reaction, but it does help maintain an acceptably high density of stored hydrogen. Composite materials that include a component that undergoes an endothermic reaction without releasing hydrogen would have their density of stored hydrogen diminished by this component.

The following EXAMPLES illustrate some non-limiting embodiments of the invention.

Example 1

Figure 2:
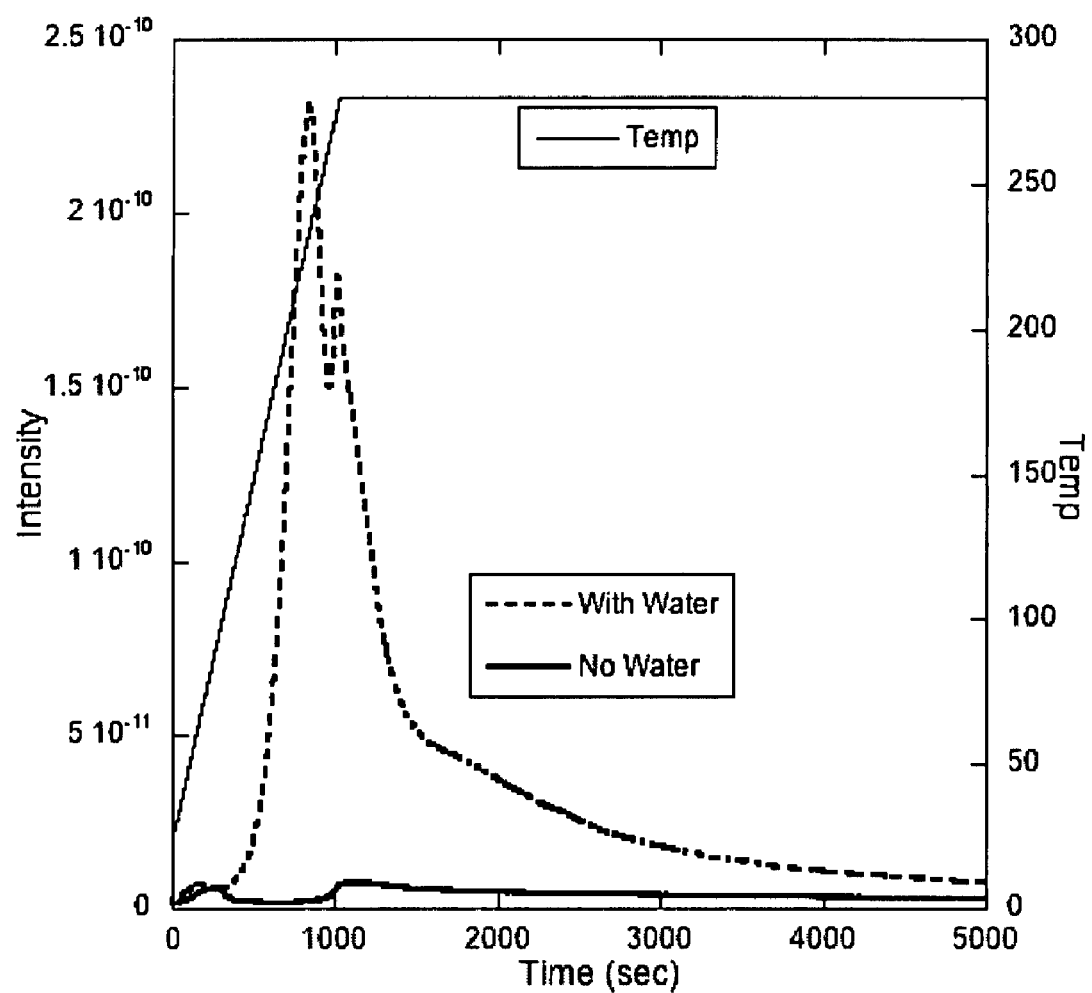
FIG. 2 shows a plot of thermal hydrogen loss from $Mg(OMe)_2$ catalyzed by BASF-K3-110.

A solid sample of magnesium methoxide (1 g) and BASF-K3-110 catalyst was heated in a stream of humid nitrogen gas at a rate of 5 degrees per minute. FIG. 1 shows a schematic representation of the experimental set-up. Hydrogen evolution at reasonable rates began at a temperature of 150° C., as shown in FIG. 2. At T=160° C., hydrogen evolution rates of 1.25 sccm/gram of material were observed. At 245° C., the maximum rate of hydrogen evolution was attained, which is around 20 sccm/gram. Data from a number of experiments indicates that the total quantity of $H_2$ liberated during a temperature ramp such as shown in FIG. 2 is between 0.4 and 0.5 std. liter/gram of material. This represents from about 30% to 40% of the amount of hydrogen expected from decomposition the total mass. The total amount of hydrogen evolved of 0.5 liters/gram was equivalent to 0.044 kg $H_2$/kg material.

Figure 3:
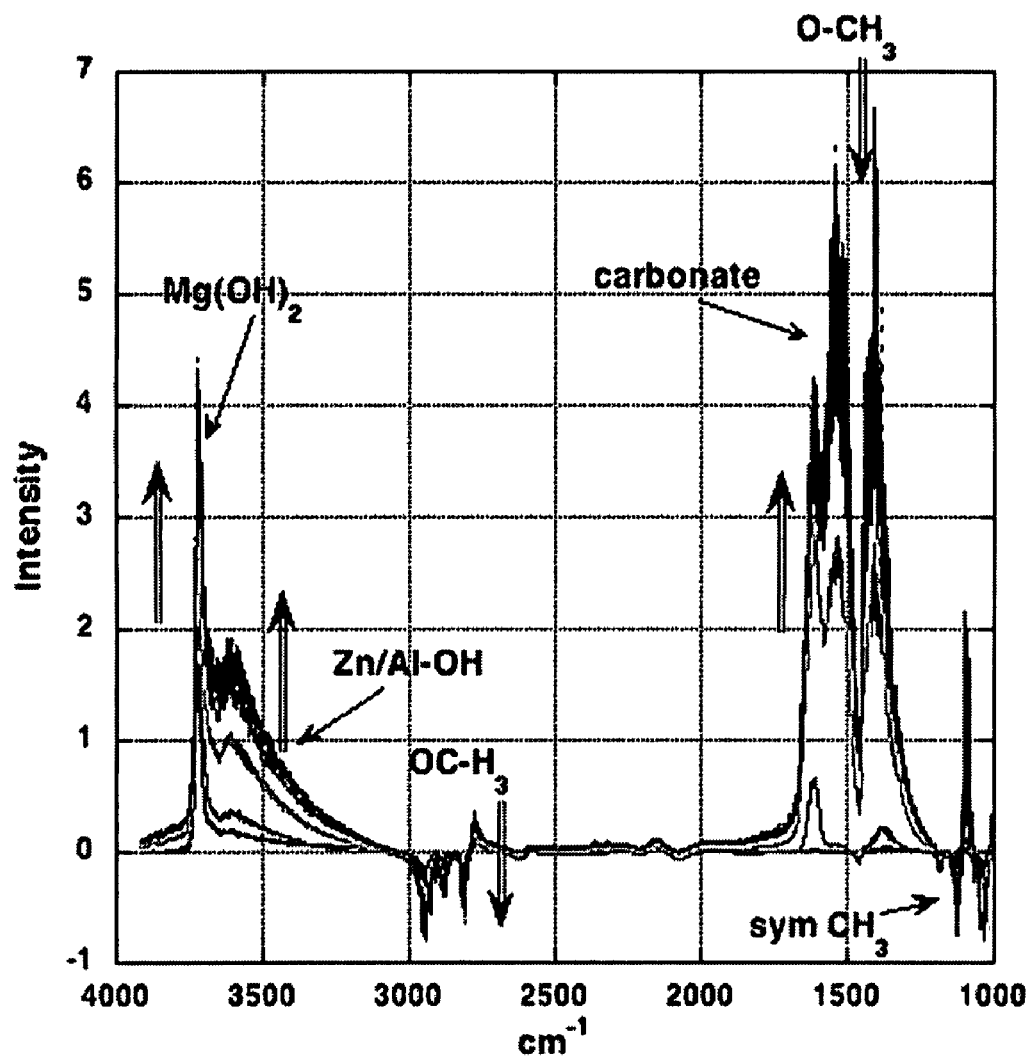
FIG. 3 shows an infrared spectrum of the thermal reaction of $Mg(OMe)_2$ catalyzed by BASF-K3-110.

FIG. 3 shows infrared spectra of the reaction of $Mg(OMe)_2$ catalyzed by BASF-K3-110. During hydrogen release growth of MgO and $Mg(CO_3)$ are observed. Concurrently, the signals for the methyl group decrease. The ZnAl—OH growth is from the catalyst.

Example 2

A solid sample of magnesium methoxide (1 g) and BASF-K3-110 catalyst (a $Cu/ZnO/Al_2O_3$ catalyst) was heated in a stream of dry nitrogen gas. This sample was heated at a rate of 5 degrees per minute. No appreciable hydrogen evolution was observed.

In summary, chemical hydrogen storage systems of the invention utilize 'coupled' reactions: an endothermic reaction that releases hydrogen 'coupled' to an exothermic reaction to achieve overall thermoneutrality. One of these systems, the catalytic aqueous reforming of alcohols to form hydrogen and carbon dioxide, involves 'coupling' the carbon dioxide formed in the endothermic hydrogen-releasing reaction with a metal oxide to form a stable metal carbonate. The exothermic formation of the metal carbonate drives the hydrogen-releasing reaction thermodynamically. Composites of magnesium methoxide/magnesium hydroxide/catalyst were prepared. When these composites are heated, they generate hydrogen at reasonable rates and quantities.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A composition for releasing hydrogen, said composition consisting essentially of magnesium alkoxide, magnesium hydroxide, and a catalyst, said catalyst being present in a quantity effective to produce hydrogen upon heating said composition.

2. The composition of claim 1, wherein said magnesium alkoxide comprises magnesium methoxide.

3. A composition comprising magnesium alkoxide, magnesium hydroxide, and a catalyst selected from the group consisting of copper, copper oxide, zinc, zinc oxide, nickel, nickel oxide, cobalt, cobalt oxide, palladium, platinum, ruthenium, rhodium, mixtures thereof, and alloys thereof.

4. The composition of claim 3, wherein the magnesium alkoxide comprises magnesium methoxide.

* * * * *